(12) United States Patent
Peng et al.

(10) Patent No.: US 11,932,959 B2
(45) Date of Patent: Mar. 19, 2024

(54) COPPER PLATING SOLUTION AND NEGATIVE ELECTRODE COMPOSITE CURRENT COLLECTOR PREPARED USING SAME

(71) Applicant: CONTEMPORARY AMPEREX TECHNOLOGY CO., LIMITED, Ningde (CN)

(72) Inventors: Jia Peng, Ningde (CN); Mingling Li, Ningde (CN); Xin Liu, Ningde (CN); Qisen Huang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/901,101

(22) Filed: Sep. 1, 2022

(65) Prior Publication Data

US 2023/0132206 A1    Apr. 27, 2023

Related U.S. Application Data

(63) Continuation of application No. PCT/CN2021/126433, filed on Oct. 26, 2021.

(51) Int. Cl.
*C25D 3/38*        (2006.01)
*C25D 17/10*       (2006.01)

(52) U.S. Cl.
CPC .............. *C25D 3/38* (2013.01); *C25D 17/10* (2013.01)

(58) Field of Classification Search
None
See application file for complete search history.

(56) References Cited

U.S. PATENT DOCUMENTS

| | | | |
|---|---|---|---|
| 2,972,572 A | | 2/1961 | Cope, Jr. et al. |
| 2,997,428 A | | 8/1961 | Harrover, Jr. et al. |
| 3,018,232 A | * | 1/1962 | Bishoff ............ C25D 3/02 205/306 |
| 4,347,108 A | | 8/1982 | Willis |
| 10,658,655 B2 | | 5/2020 | Chae et al. |
| 2003/0111349 A1 | | 6/2003 | Sierakowski et al. |

FOREIGN PATENT DOCUMENTS

| | | |
|---|---|---|
| CA | 105316715 A | 2/2016 |
| CN | 101092724 A | 12/2007 |
| CN | 104073845 A | 10/2014 |
| CN | 105350043 A | 2/2016 |
| CN | 107217283 A | 9/2017 |
| CN | 107858716 A | 3/2018 |
| CN | 110373687 A | 10/2019 |
| CN | 110943227 A | 3/2020 |
| CN | 111088509 A | 5/2020 |
| CN | 111793810 A | 10/2020 |
| CN | 111962108 A | 11/2020 |
| CN | 112680758 A | 4/2021 |
| CN | 112899736 A | 6/2021 |
| CN | 113061947 A | 7/2021 |
| JP | S49-135832 A | 12/1974 |
| JP | S61253376 A | 11/1986 |
| JP | 2004022466 A | 1/2004 |

OTHER PUBLICATIONS

Extended European Search Report dated Apr. 25, 2023 for Application No. EP 21928341.3.
Korean office action dated Apr. 28, 2023 for Application No. KR 10-2023-7001516.
International Search Report of Application No. PCT/CN2021/126433 dated Dec. 28, 2021.
Written Opinion of Application No. PCT/CN2021/126433 dated Dec. 28, 2021.
Japanese office action dated Nov. 28, 2023 for Application No. JP 2023-502963.
Korean office action dated Dec. 27, 2023 for Application No. KR 10-2023-7001516.

\* cited by examiner

*Primary Examiner* — Wojciech Haske
(74) *Attorney, Agent, or Firm* — Ladas & Parry LLP

(57) ABSTRACT

This application provides a copper plating solution for a composite current collector, including a leveling agent represented by a general formula (1)

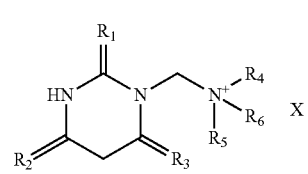

(1)

where an anion X is $F^-$, $Cl^-$, or $Br^-$;
$R_1$, $R_2$, and $R_3$ are each independently selected from O or S; and
$R_4$, $R_5$, and $R_6$ are each independently selected from hydrogen, a substituted or unsubstituted alkyl, a substituted or unsubstituted vinyl, a substituted or unsubstituted aryl, and a substituted or unsubstituted heteroaryl.

15 Claims, 4 Drawing Sheets

COPPER PLATING SOLUTION AND NEGATIVE ELECTRODE COMPOSITE CURRENT COLLECTOR PREPARED USING SAME

CROSS-REFERENCE TO RELATED APPLICATIONS

This application is a continuation of International Patent Application No. PCT/CN2021/126433 filed on Oct. 26, 2021. The above-referenced application is incorporated herein by reference in its entirety.

TECHNICAL FIELD

This application relates to the field of lithium battery technologies, and in particular, to a copper plating solution and a negative electrode composite current collector prepared using same, a secondary battery, a battery module, a battery pack, and an electric apparatus.

BACKGROUND

In recent years, with increasingly wide application of lithium-ion batteries, lithium-ion batteries have been widely used in energy storage power supply systems such as hydropower stations, thermal power stations, wind power stations, and solar power stations, as well as many fields such as electric tools, electric bicycles, electric motorcycles, electric vehicles, military equipment, and aerospace. Due to the great development of lithium-ion batteries, higher requirements are imposed on energy density, cycling performance, safety performance, and the like of lithium-ion batteries. Safety performance and cycling performance of lithium-ion batteries need to be improved urgently, especially when composite current collectors are used.

SUMMARY

This application has been made in view of the foregoing issues. An objective of this application is to provide a copper plating solution, to allow a negative electrode composite current collector prepared using same to have excellent plating adhesion as well as high tensile strength and elongation rate.

To achieve the foregoing objective, this application provides a copper plating solution and a negative electrode composite current collector prepared using same, a secondary battery, a battery module, a battery pack, and an electric apparatus.

A first aspect of this application provides a copper plating solution for a composite current collector, including a leveling agent represented by a general formula (1)

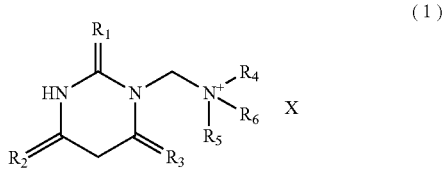

(1)

where an anion X is F⁻, Cl⁻, or Br⁻;
$R_1$, $R_2$, and $R_3$ are each independently selected from O or S; and $R_4$, $R_5$, and $R_6$ are each independently selected from hydrogen, a substituted or unsubstituted alkyl, a substituted or unsubstituted vinyl, a substituted or unsubstituted aryl, and a substituted or unsubstituted heteroaryl.

The copper plating solution of this application includes the leveling agent having a specific structure, where the leveling agent has a relatively low energy level difference and a relatively high dipole moment, and can be absorbed on a copper surface in an electroplating process, resulting in an increase in both cathode potential and charge transfer resistance, thereby inhibiting deposition of copper on a surface and providing a more uniform electroplated copper layer. This allows a composite current collector prepared using the copper plating solution to have excellent plating adhesion and high tensile strength and elongation, thereby improving cycling performance of lithium-ion batteries.

In any embodiment, $R_4$, $R_5$, and $R_6$ are each independently selected from hydrogen, a substituted or unsubstituted alkyl having 1-6 carbon atoms, a substituted or unsubstituted vinyl having 2-6 carbon atoms, and a substituted or unsubstituted pyrimidyl.

In any embodiment, the leveling agent is

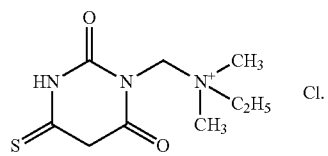

In any embodiment, the copper plating solution further includes copper sulfate, sulfuric acid, hydrochloric acid, a brightener, a moistening agent, and deionized water.

In any embodiment, the brightener is a compound containing a disulfide bond, a sulfonic acid group, or a sulfhydryl.

In any embodiment, the brightener is one or two of bis-(sodium sulfopropyl)-disulfide and sodium 3-mercaptopropanesulphonate.

In any embodiment, the moistening agent is at least one of polyethylene glycol and polypropylene glycol.

In any embodiment, the polyethylene glycol has a number-average molecular weight of 4000-15000, and the polypropylene glycol has a number-average molecular weight of 5000-20000. When a molecular weight of the moistening agent is controlled within a given range, a dense barrier layer may be formed on a cathode surface, inhibiting rapid deposition of copper.

In any embodiment, the copper plating solution further includes a grain refiner. When the copper plating solution further includes the grain refiner, the grain refiner can make copper grains finer.

In any embodiment, the grain refiner is at least one of acetaldehyde and ethylene diamine tetraacetic acid (EDTA).

In any embodiment, each liter of copper plating solution contains 60-120 g/L of copper sulfate, 80-110 mL/L of 98% sulfuric acid, 40-90 ppm of hydrochloric acid measured in chloride ions, 2-12 mL/L of the brightener, 1-4 mL/L of the leveling agent, 0.5-2 mL/L of the moistening agent, 0.01-0.2 mL/L of the grain refiner, and deionized water for the rest part. When specific amounts of all components are controlled within the given ranges, uniformity of the plating layer can be further improved.

In any embodiment, an applicable temperature range of the copper plating solution is 20-50° C., optionally 20-45° C., and further optionally 20-35° C. When the temperature is controlled within the given range, activity of an organic additive can be more effective.

In any embodiment, an applicable cathode current density of the copper plating solution is 1-20 A/dm$^2$, optionally 1-15 A/dm$^2$, and further optionally 1-10 A/dm$^2$. When the cathode current density is controlled within the given range, a dense plating layer can be obtained.

In any embodiment, an applicable anode current density of the copper plating solution is 0.5-3 A/dm$^2$. When the anode current density is controlled within the given range, brightness and smoothness of a plating layer obtained can be further improved.

In any embodiment, the copper plating solution has a pH value ranging from 0.5 to 4. When the pH value is within the given range, plating homogenization of the plating solution and solubility at anode can be improved.

A second aspect of this application further provides a negative electrode composite current collector, including a polymer matrix and copper layers formed on two surfaces of the polymer matrix respectively, where the copper layer is obtained through electroplating using the copper plating solution according to the first aspect of this application.

A third aspect of this application provides a secondary battery, including the negative electrode composite current collector according to the second aspect of this application.

A fourth aspect of this application provides a battery module, including the secondary battery according to the third aspect of this application.

A fifth aspect of this application provides a battery pack, including the battery module according to the fourth aspect of this application.

A sixth aspect of this application provides an electric apparatus, including at least one of the secondary battery according to the third aspect of this application, the battery module according to the fourth aspect of this application, or the battery pack according to the fifth aspect of this application.

Figure 1:
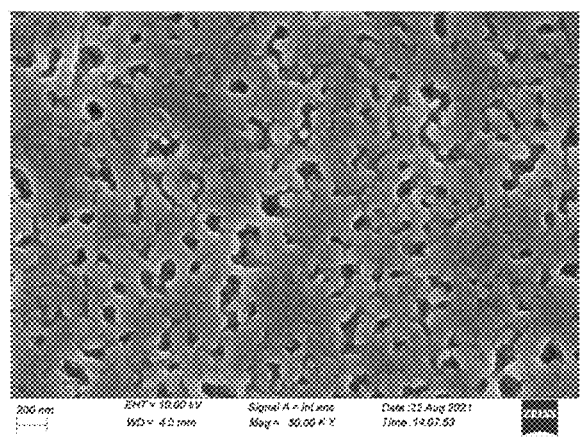
FIG. 1 is a scanning electron microscope (SEM) image of a copper layer prepared using a conventional PCB plating solution.

Reference signs are described as follows:

1. battery pack; 2. upper box body; 3. lower box body; 4. battery module; 5. secondary battery; 51. housing; 52. electrode assembly; and 53. top cover assembly.

DESCRIPTION OF EMBODIMENTS

The following specifically discloses embodiments of a copper plating solution and a negative electrode composite current collector prepared using same, a secondary battery, a battery module, a battery pack, and an electric apparatus in this application with appropriate reference to detailed descriptions of accompanying drawings. However, unnecessary detailed descriptions may be omitted. For example, detailed descriptions for well-known matters or overlapping descriptions for actual identical structures have been omitted. This is to avoid unnecessary cumbersomeness of the following descriptions, to facilitate understanding by persons skilled in the art. In addition, accompanying drawings and the following descriptions are provided for persons skilled in the art to fully understand this application and are not intended to limit the subject described in the claims.

"Ranges" disclosed in this application are defined in the form of lower and upper limits, given ranges are defined by selecting lower and upper limits, and the selected lower and upper limits define boundaries of special ranges. Ranges defined in such method may or may not include end values, and any combination may be used, to be specific, any lower limit may be combined with any upper limit to form a range. For example, if ranges of 60-120 and 80-110 are provided for a specific parameter, it should be understood that ranges of 60-110 and 80-120 can also be envisioned. In addition, if minimum values of a range are given as 1 and 2, and maximum values of the range are given as 3, 4, and 5, the following ranges can all be envisioned: 1-3, 1-4, 1-5, 2-3, 2-4, and 2-5. In this application, unless otherwise specified, a numerical range of "a-b" is an abbreviated representation of any combination of real numbers from a to b, where both a and b are real numbers. For example, a numerical range of "0-5" means that all real numbers in the range of "0-5" are listed herein, and "0-5" is just an abbreviated representation of a combination of these numbers. In addition, when a parameter is expressed as an integer greater than or equal to 2, it is equivalent to disclosure that the parameter is, for example, an integer among 2, 3, 4, 5, 6, 7, 8, 9, 10, 11, 12, and so on.

Unless otherwise specified, all the embodiments and optional embodiments of this application can be mutually combined to form a new technical solution.

Unless otherwise specified, all the technical features and optional technical features of this application can be mutually combined to form a new technical solution.

Unless otherwise specified, all the steps in this application can be performed in sequence or at random, or preferably, are performed in sequence. For example, a method including steps (a) and (b) indicates that the method may include steps (a) and (b) performed in sequence, or may include steps (b) and (a) performed in sequence. For example, that the method may further include step (c) indicates that step (c) may be added to the method in any order. For example, the method may include steps (a), (b), and (c), or steps (a), (c), and (b), or steps (c), (a), and (b), or the like.

Unless otherwise specified, "include" and "contain" mentioned in this application is inclusive or may be exclusive. For example, terms "include" and "contain" can mean that other unlisted components may also be included or contained, or only listed components may be included or contained.

Unless otherwise specified, in this application, the term "or" is inclusive. For example, a phrase "A or B" means "A, B, or both A and B". More specifically, any of the following conditions satisfies the condition "A or B": A is true (or present) and B is false (or not present); A is false (or not present) and B is true (or present); or both A and B are true (or present).

A formula of a plating solution has always been applied to the PCB industry and is mainly used for dressing hole filling, and a plating layer obtained using same is generally dozens of microns in thickness. Electroplating is also required in a production process of composite current collector. However, unlike conventional plating industry, in the production process of composite current collector, electroplating is not performed on a metal surface, but on a polymer layer with a metal base, and a plating layer obtained therefrom is approximately 1 micron in thickness. An electroplating process of the composite current collector does not require a high aspect ratio, but require excellent plating adhesion and tensile strength and elongation that meet requirements. Therefore, plating solution formulas for conventional industries are not suitable for the production process of composite current collector.

Through extensive experiments, the inventor of this application found that a copper plating solution including a specific leveling agent can improve uniformity of a surface of a plating layer of a negative electrode composite current collector, and increase plating adhesion, tensile strength, and elongation of the negative electrode composite current collector, thereby improving cycling performance of lithium-ion batteries.

Copper Plating Solution

An embodiment of this application provides a copper plating solution for a composite current collector, including a leveling agent represented by a general formula (1)

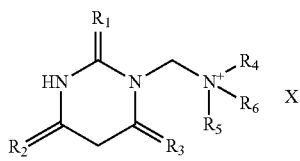

(1)

where an anion X is F$^-$, Cl$^-$, or Br$^-$;

R$_1$, R$_2$, and R$_3$ are each independently selected from O or S; and

R$_4$, R$_5$, and R$_6$ are each independently selected from hydrogen, a substituted or unsubstituted alkyl, a substituted or unsubstituted vinyl, a substituted or unsubstituted aryl, and a substituted or unsubstituted heteroaryl.

In this application, the leveling agent having a specific structure is added into the copper plating solution, where the leveling agent has a relatively low energy level difference and a relatively high dipole moment, and can be absorbed on a copper surface in an electroplating process, resulting in an increase in both cathode potential and charge transfer resistance, thereby inhibiting deposition of copper on a surface, and providing a more uniform electroplated copper layer. This allows a composite current collector prepared using the copper plating solution to have excellent plating adhesion and high tensile strength and elongation, thereby improving cycling performance of lithium-ion batteries.

A molecular structure of the leveling agent mainly includes two parts, namely, pyrimidine ring structures on a left side and N+ ion structures on a right side. In an electroplating process, the pyrimidine ring structures are absorbed on a copper surface in parallel, which reduces an effective area for electrochemical reaction and slows down deposition of copper on a surface, making a deposited layer uniform; and the N+ ion structures have strong positive electricity in a strong acid solution, and are easily adsorbed in a region with high current density under an action of an electric field, thus reducing a deposition rate of Cu$^{2+}$ in the region with high current density, and further making the deposited copper layer uniform.

In some embodiments, R$_4$, R$_5$, and R$_6$ are each independently selected from hydrogen, a substituted or unsubstituted alkyl having 1-6 carbon atoms, a substituted or unsubstituted vinyl having 2-6 carbon atoms, and a substituted or unsubstituted pyrimidyl.

In some embodiments, R$_4$, R$_5$, and R$_6$ are each independently selected from hydrogen, a substituted or unsubstituted alkyl having 1-4 carbon atoms, and a substituted or unsubstituted vinyl having 2-4 carbon atoms In some embodiments, R$_4$, R$_5$, and R$_6$ are each independently selected from hydrogen, methyl, ethyl, propyl, isopropyl, butyl, tertiary butyl, vinyl, propenyl, butenyl, phenyl, and pyrimidyl.

In some embodiments, R$_4$, R$_5$, and R$_6$ are each independently selected from hydrogen, methyl, ethyl, propyl, vinyl, phenyl, and pyrimidyl.

In some embodiments, the leveling agent is

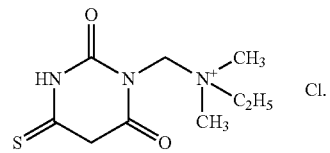

In some embodiments, an amount of the leveling agent in the copper plating solution is 1-4 mL/L.

In some embodiments, the copper plating solution further includes copper sulfate, sulfuric acid, hydrochloric acid, a brightener, a moistening agent, and deionized water.

The sulfuric acid is mainly used to reduce a resistance of the plating solution, improve conductivity, prevent hydrolysis of a copper salt, and improve plating homogenization of the plating solution and solubility at anode. The copper sulfate is mainly used to conduct electricity and provide copper ions; chloride ions are mainly used to help dissolution at anode and assist crystallization at cathode. The brightener is mainly used to increase nucleus formation at depressions. The moistening agent is absorbed on a plating surface, increasing a surface impedance and inhibiting rapid growth of copper.

In some embodiments, the brightener is a compound containing a disulfide bond, a sulfonic acid group, or a sulfhydryl.

In some embodiments, the brightener is one or two of bis-(sodium sulfopropyl)-disulfide and sodium 3-mercaptopropanesulphonate.

In some embodiments, the moistening agent is at least one of polyethylene glycol and polypropylene glycol.

In some embodiments, the polyethylene glycol has a number-average molecular weight of 4000-15000, and the polypropylene glycol has a number-average molecular weight of 5000-20000.

When a molecular weight of the moistening agent is controlled within a given range, a dense barrier layer may be formed on a cathode surface, inhibiting rapid deposition of copper. In a case that a molecular weight of the moistening agent is excessively low, the dense barrier layer may not be formed on the cathode surface, which is unable to inhibit deposition of copper; in a case that a molecular weight of the moistening agent is excessively high, solubility of the moistening agent drops, and micelles are formed in the plating solution, reducing wettability of the moistening agent.

In some embodiments, the copper plating solution further includes a grain refiner.

The grain refiner is mainly used to increase deposition of copper ions at a low current, prevent the copper ions from being etched by sulfuric acid, and allow deposited copper grains to be finer.

In some embodiments, the grain refiner is at least one of acetaldehyde and ethylene diamine tetraacetic acid (EDTA).

In some embodiments, each liter of copper plating solution contains 60-120 g/L of copper sulfate, 80-110 mL/L of 98% sulfuric acid, 40-90 ppm of hydrochloric acid (measured in chloride ions), 2-12 mL/L of the brightener, 1-4 mL/L of the leveling agent, 0.5-2 mL/L of the moistening agent, 0.01-0.2 mL/L of the grain refiner, and deionized water for the rest part.

When specific amounts of all components are controlled within the given ranges, uniformity of the plating layer can be further improved. An excessively high concentration of sulfuric acid leads to a decrease in a migration rate of $Cu^{2+}$, which decreases elongation of the plating layer; and an excessively low concentration of sulfuric acid leads to poor conductivity of the solution, resulting in poor dispersive capacity of the plating solution. In a case that a concentration of the copper sulfate is excessively high, a leveling capacity of the plating solution is decreased, a deposition rate is too fast, and generated grains are larger, affecting uniformity of the plating layer. However, in a case that a concentration of the copper sulfate is excessively low, although coverage and dispersion ability of the plating solution are slightly improved, brightness and smoothness of a copper plating layer decrease, a deposition rate is slower, and scorching further occurs when electroplating is performed at a high current density. In a case that concentration of chloride ions is excessively high, the anode will be passivated, a layer of white film is produced at the cathode, and a large number of bubbles are released, which reduces efficiency of an electrode; and in a case that the concentration of the chloride ions is excessively low, the plating layer becomes a step-shaped dull and rough plating layer that is prone to pinholes and scorching.

In some embodiments, the grain refiner is acetaldehyde.

In some embodiments, each liter of copper plating solution contains 60-120 g/L of copper sulfate, 80-110 mL/L of 98% sulfuric acid, 40-90 ppm of hydrochloric acid (measured in chloride ions), 2-12 mL/L of the brightener, 1-4 mL/L of the leveling agent, 0.5-2 mL/L of the moistening agent, 0.01-0.05 mL/L of acetaldehyde, and deionized water for the rest part.

In some embodiments, the grain refiner is ethylene diamine tetraacetic acid.

In some embodiments, each liter of copper plating solution contains 60-120 g/L of copper sulfate, 80-110 mL/L of 98% sulfuric acid, 40-90 ppm of hydrochloric acid (measured in chloride ions), 2-10 mL/L of the brightener, 1-4 mL/L of the leveling agent, 0.5-2 mL/L of the moistening agent, 0.05-0.2 mL/L of ethylene diamine tetraacetic acid, and deionized water for the rest part.

In some embodiments, the grain refiner is acetaldehyde and ethylene diamine tetraacetic acid.

In some embodiments, each liter of copper plating solution contains 60-120 g/L of copper sulfate, 80-110 mL/L of 98% sulfuric acid, 40-90 ppm of hydrochloric acid (measured in chloride ions), 2-12 mL/L of the brightener, 1-4 mL/L of the leveling agent, 0.5-2 mL/L of the moistening agent, 0.01-0.1 mL/L of acetaldehyde and ethylene diamine tetraacetic acid, and deionized water for the rest part.

In some embodiments, a volume ratio of acetaldehyde to ethylene diamine tetraacetic acid is 2:1.

In some embodiments, an applicable temperature range of the copper plating solution is 20-50° C., optionally 20-45° C., and further optionally 20-35° C.

An excessively low operating temperature of the copper plating solution affects reactivity of an organic additive, resulting in a decrease in a migration rate and deposition rate of copper ions; an excessively high operating temperature of the copper plating solution makes an organic matter to decompose more easily, causing the copper plating solution to fail or become less effective.

In some embodiments, an applicable cathode current density of the copper plating solution is 1-20 $A/dm^2$, optionally 1-15 $A/dm^2$, and further optionally 1-10 $A/dm^2$.

When the cathode current density is controlled within the given range, a dense plating layer can be obtained. An excessively high current density at cathode causes the plating player to be burned or scorched; an excessively low current density at cathode causes grains in the plating layer to be coarsened, and even results in failure in deposition on the plating layer.

In some embodiments, an applicable anode current density of the copper plating solution is 0.5-3 $A/dm^2$.

When the anode current density is controlled within the given range, brightness and smoothness of a plating layer obtained can be further improved. If a current density at anode is excessively high, an amount of copper ions produced by electrolysis is larger than that of copper ions deposited. As an amount of copper in a bath solution increases constantly, consumption of an additive is accelerated, copper powder and anode slime in the bath solution increase, utilization efficiency of an anode decreases, and the plating layer is prone to burrs and roughness; and if a current density is excessively low, an amount of copper decreases constantly, affecting brightness and smoothness of the plating layer.

In some embodiments, the copper plating solution has a pH value ranging from 0.5 to 4.

When the pH value is within the given range, plating homogenization of the plating solution and solubility at anode can be improved.

In some embodiments, a preparation method of the copper plating solution includes the following steps:

1. Deionized water was added into a container with an added amount equal to ⅔ of a volume of deionized water required;

2. Concentrated sulfuric acid was added in proportion and mixed, with a liquid temperature below 50° C. in the mixing process; and the liquid was left standing for 1 h till the liquid temperature drops to below 30° C.;

3. Copper sulfate was added in proportion, and the liquid was mixed till the copper sulfate fully dissolved;

4. Hydrochloric acid, a brightener, a leveling agent, a moistening agent, and a grain refiner were added in proportion and mixed;

5. Remaining ⅓ volume of deionized water was added and mixed uniformly to obtain the copper plating solution.

An embodiment of this application provides a negative electrode composite current collector, including a polymer matrix and copper layers formed on two surfaces of the polymer matrix respectively, where the copper layer is obtained through electroplating using the copper plating solution according to the first aspect of this application.

In some embodiments, the polymer matrix is selected from polyamide, polyterephthalate, polyimide, polyethylene, polypropylene, polystyrene, polyvinyl chloride, acrylonitrile-butadiene-styrene copolymer, polybutylene terephthalate, poly (p-phenylene terephthamide), poly (p-phenylene terephthamide), polystyrene, polyformaldehyde, epoxy resin, phenolic resin, polytetrafluoroethylene, polyvinylidene fluoride, silicone rubber, and polycarbonate.

In some embodiments, thickness of the copper layer is 2-12 μm.

In some embodiments, a preparation method of the plating includes: using a polymer material PVD base matrix as a cathode, and using phosphorus copper as an anode, which are placed in an electroplating bath containing the copper plating solution according to the first aspect of this application for direct current electroplating.

In some embodiments, a preparation method of the PVD base matrix includes: plating a copper layer on a surface of a polymer matrix by using a physical vapor deposition (PVD) method.

In some embodiments, the PVD method is preferably at least one of evaporation method and sputtering method.

In some embodiments, in an electroplating process, a temperature range is 20-50° C., optionally 20-45° C., and further optionally 20-35° C.

In some embodiments, in an electroplating process, a cathode current density is 1-20 A/dm$^2$, optionally 1-15 A/dm$^2$, and further optionally 1-10 A/dm$^2$.

In some embodiments, in an electroplating process, an anode current density is 0.5-3 A/dm$^2$.

In some embodiments, an electroplating time is 1-5 min.

In addition, the following describes a secondary battery, a battery module, a battery pack, and an electric apparatus in this application with appropriate reference to the accompanying drawings.

An embodiment of this application provides a secondary battery.

Normally, the secondary battery includes a positive electrode plate, a negative electrode plate, an electrolyte, and a separator. In a battery charging/discharging process, active ions are intercalated and deintercalated back and forth between the positive electrode plate and the negative electrode plate. The electrolyte conducts ions between the positive electrode plate and the negative electrode plate. The separator is disposed between the positive electrode plate and the negative electrode plate to prevent short circuit of the positive electrode and the negative electrode and to allow the ions to pass through.

[Positive Electrode Plate]

The positive electrode plate includes a positive electrode current collector and a positive electrode film layer provided on at least one surface of the positive electrode current collector, and the positive electrode film layer includes a positive electrode active material.

In an example, the positive electrode current collector includes two back-to-back surfaces in a thickness direction thereof, and the positive electrode film layer is provided on either or both of the two back-to-back surfaces of the positive electrode current collector.

In some embodiments, the positive electrode current collector may use a metal foil or a composite current collector. For example, for the metal foil, an aluminum foil may be used. The composite current collector may include a polymer matrix and a metal layer formed on at least one surface of the polymer matrix. The composite current collector may be formed by forming a metal material (aluminum, aluminum alloy, nickel, nickel alloy, titanium, titanium alloy, silver, silver alloy, or the like) on the polymer matrix (for example, matrices of polypropylene (PP), polyethylene terephthalate (PET), polybutylene terephthalate (PBT), polystyrene (PS), and polyethylene (PE)).

In some embodiments, the positive electrode active material may be a positive electrode active material for batteries well known in the art. In an example, the positive electrode active material may include at least one of the following: olivine-structured lithium-containing phosphate, lithium transition metal oxide, and respective modified compounds thereof. However, this application is not limited to such materials, and may also use other conventional materials that can be used as positive electrode active materials for batteries. One of these positive electrode active materials may be used alone, or two or more of them may be used in combination. Examples of the lithium transition metal oxide may include, but are not limited to, at least one of lithium cobalt oxide (for example, $LiCoO_2$), lithium nickel oxide (for example, $LiNiO_2$), lithium manganese oxide (for example, $LiMnO_2$ and $LiMn_2O_4$), lithium nickel cobalt oxide, lithium manganese cobalt oxide, lithium nickel manganese oxide, lithium nickel cobalt manganese oxide (for example, $LiNi_{1/3}Co_{1/3}Mn_{1/3}O_2$ (NCM333 for short), $LiNi_{0.5}Co_{0.2}Mn_{0.3}O_2$ (NCM523 for short), $LiNi_{0.5}Co_{0.25}Mn_{0.25}O_2$ (NCM211 for short), $LiNi_{0.6}Co_{0.2}Mn_{0.2}O_2$ (NCM622 for short) and $LiNi_{0.5}Co_{0.1}Mn_{0.1}O_2$ (NCM811 for short)), lithium nickel cobalt aluminum oxide (for example, $LiNi_{0.85}Co_{0.15}Al_{0.05}O_2$), and modified compounds thereof. Examples of the olivine-structured lithium-containing phosphate may include, but are not limited to, at least one of lithium iron phosphate (for example, $LiFePO_4$ (LFP)), composite material of lithium iron phosphate and carbon, lithium manganese phosphate (for example, $LiMnPO_4$), composite material of lithium manganese phosphate and carbon, lithium manganese iron phosphate, and composite material of lithium manganese iron phosphate and carbon.

In some embodiments, the positive electrode film layer may further optionally include a binder. In an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylic resin.

In some embodiments, the positive electrode film layer further optionally includes a conductive agent. In an example, the conductive agent may include at least one of superconducting carbon, acetylene black, carbon black, Ketjen black, carbon dots, carbon nanotubes, graphene, and carbon nanofibers.

In some embodiments, the positive electrode plate may be prepared by using the following method: the foregoing components used for preparing a positive electrode plate, for example, the positive electrode active material, conductive agent, binder, and any other components, are dispersed in a solvent (for example, N-methylpyrrolidone) to form a uniform positive electrode slurry; the positive electrode slurry is applied on the positive electrode current collector, and then processes such as drying and cold pressing are performed to obtain the positive electrode plate.

[Negative Electrode Plate]

The negative electrode plate includes a negative electrode current collector and a negative electrode film layer disposed on at least one surface of the negative electrode current collector, where the negative electrode current collector is the negative electrode current collector according to the second aspect of this application, and the negative electrode film layer includes a negative electrode active material.

In an example, the negative electrode current collector includes two back-to-back surfaces in a thickness direction thereof, and the negative electrode film layer is provided on either or both of the two back-to-back surfaces of the negative electrode current collector.

In some embodiments, the negative electrode active material may be a negative electrode active material for batteries well known in the art. In an example, the negative electrode active material may include at least one of artificial graphite, natural graphite, soft carbon, hard carbon, silicon-based materials, tin-based materials, lithium titanate, and the like. The silicon-based material may be selected from at least one of elemental silicon, silicon-oxygen compound, silicon-carbon composite, silicon-nitrogen composite, and silicon alloy. The tin-based material may be selected from at least one of elemental tin, tin-oxygen compound, and tin alloy. However, this application is not limited to these materials, and may also use other conventional materials that can be used as negative electrode active materials for batteries. One of these negative electrode active materials may be used alone, or two or more of them may be used in combination.

In some embodiments, the negative electrode film layer may further optionally include a binder. The binder may be selected from at least one of styrene butadiene rubber (SBR), polyacrylic acid (PAA), polyacrylic acid sodium (PAAS), polyacrylamide (PAM), polyvinyl alcohol (PVA), sodium alginate (SA), polymethacrylic acid (PMAA), and carboxymethyl chitosan (CMCS).

In some embodiments, the negative electrode film layer further optionally includes a conductive agent. The conductive agent may be selected from at least one of superconducting carbon, acetylene black, carbon black, Ketjen black, carbon dots, carbon nanotubes, graphene, and carbon nanofibers.

In some embodiments, the negative electrode film layer further optionally includes other additives, for example, a thickener (for example, sodium carboxymethyl cellulose (CMC-Na)).

In some embodiments, the negative electrode plate may be prepared by using the following method: the foregoing components used for preparing a negative electrode plate, for example, the negative electrode active material, conductive agent, binder, and any other components, are dispersed in a solvent (for example, deionized water) to form a negative electrode slurry; the negative electrode slurry is applied on the negative electrode current collector, and then processes such as drying and cold pressing are performed to obtain the negative electrode plate.

[Electrolyte]

The electrolyte conducts ions between the positive electrode plate and the negative electrode plate. The electrolyte is not limited to any specific type in this application, and may be selected as required. For example, the electrolyte may be in a liquid state, a gel state, or an all-solid-state.

In some embodiments, the electrolyte is an electrolyte solution. The electrolyte solution includes an electrolytic salt and a solvent.

In some embodiments, the electrolytic salt may be selected from at least one of lithium hexafluorophosphate, lithium tetrafluoroborate, lithium perchlorate, lithium hexafluoroarsenate, lithium bis(fluorosulfonyl)imide, lithium bis-trifluoromethanesulfonimide (LiTFSI), lithium trifluoromethanesulfonate, lithium difluoro(oxalato)borate), lithium dioxalate borate, lithium difluorophosphate, lithium difluoro(dioxalato)phosphate, and lithium tetrafluoro oxalato phosphate.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, methyl sulfonyl methane, ethyl methanesulfonate, and diethyl sulfone.

In some embodiments, the electrolyte solution further optionally includes an additive. For example, the additive may include a negative electrode film-forming additive, a positive electrode film-forming additive, or may further include an additive capable of improving some performance of the battery, for example, an additive for improving overcharge performance of the battery, an additive for improving high-temperature performance of the battery, or an additive for improving low-temperature performance of the battery.

[Separator]

In some embodiments, the secondary battery further includes a separator. The separator is not limited to any specific type in this application, and may be any commonly known porous separator with good chemical stability and mechanical stability.

In some embodiments, a material of the separator may be selected from at least one of glass fiber, non-woven fabric, polyethylene, polypropylene, and polyvinylidene fluoride. The separator may be a single-layer film or a multi-layer composite film, and is not specifically limited. When the separator is a multi-layer composite film, all layers may be made of same or different materials, which is not particularly limited.

In some embodiments, the positive electrode plate, the negative electrode plate, and the separator may be made into an electrode assembly through winding or lamination.

In some embodiments, the secondary battery may include an outer package. The outer package may be used for packaging the electrode assembly and the electrolyte.

In some embodiments, the outer package of the secondary battery may be a hard shell, for example, a hard plastic shell, an aluminum shell, or a steel shell. The outer package of the secondary battery may alternatively be a soft pack, for example, a soft pouch. A material of the soft pack may be plastic. As the plastic, polypropylene, polybutylene terephthalate, polybutylene succinate, and the like may be listed.

Figure 4:
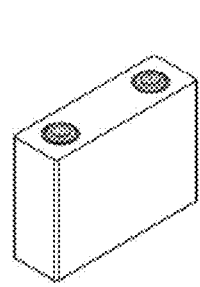
FIG. 4 is a schematic diagram of a secondary battery according to an embodiment of this application.

This application does not impose special limitations on a shape of the secondary battery, and the secondary battery may be cylindrical, rectangular, or of any other shapes. For example, FIG. 4 shows a secondary battery 5 of a rectangular structure as an example.

Figure 5:
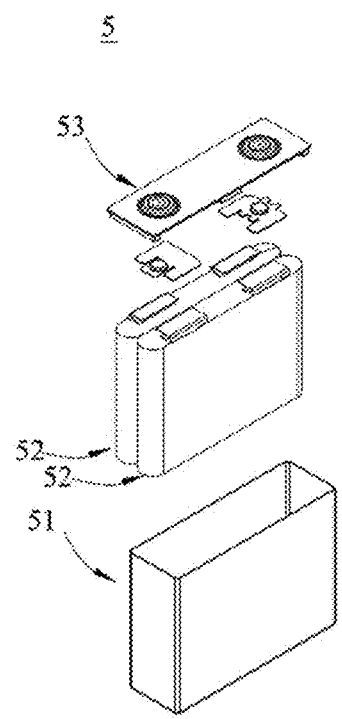
FIG. 5 is an exploded view of the secondary battery according to the embodiment of this application in FIG. 4.

In some embodiments, referring to FIG. 5, the outer package may include a housing 51 and a cover plate 53. The housing 51 may include a base plate and a side plate connected onto the base plate, and the base plate and the side plate enclose an accommodating cavity. The housing 51 has an opening communicating with the accommodating cavity, and the cover plate 53 can cover the opening to close the accommodating cavity. The positive electrode plate, the negative electrode plate, and the separator may be made into an electrode assembly 52 through winding or lamination. The electrode assembly 52 is packaged in the accommodating cavity. The electrolyte infiltrates the electrode assembly 52. There may be one or more electrode assemblies 52 in the secondary battery 5, and persons skilled in the art may make choices according to actual requirements.

In some embodiments, secondary batteries may be assembled into a battery module, and the battery module may include one or more secondary batteries. A specific quantity may be chosen by persons skilled in the art based on use and capacity of the battery module.

Figure 6:
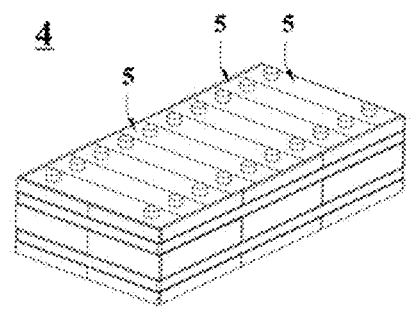
FIG. 6 is a schematic diagram of a battery module according to an embodiment of this application.

FIG. 6 shows a battery module 4 as an example. Referring to FIG. 6, in the battery module 4, a plurality of secondary batteries 5 may be sequentially arranged in a length direction of the battery module 4. Certainly, the secondary batteries 5 may alternatively be arranged in any other manner. Further, the plurality of secondary batteries 5 may be fastened through fasteners.

Optionally, the battery module 4 may further include a housing with an accommodating space, and the plurality of secondary batteries 5 are accommodated in the accommodating space.

In some embodiments, the battery module may be further assembled into a battery pack, and the battery pack may include one or more battery modules. A specific quantity may be chosen by persons skilled in the art based on use and capacity of the battery pack.

Figure 7:
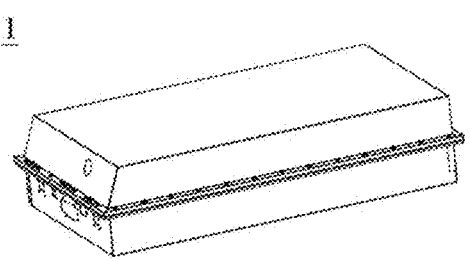
FIG. 7 is a schematic diagram of a battery pack according to an embodiment of this application.
Figure 8:
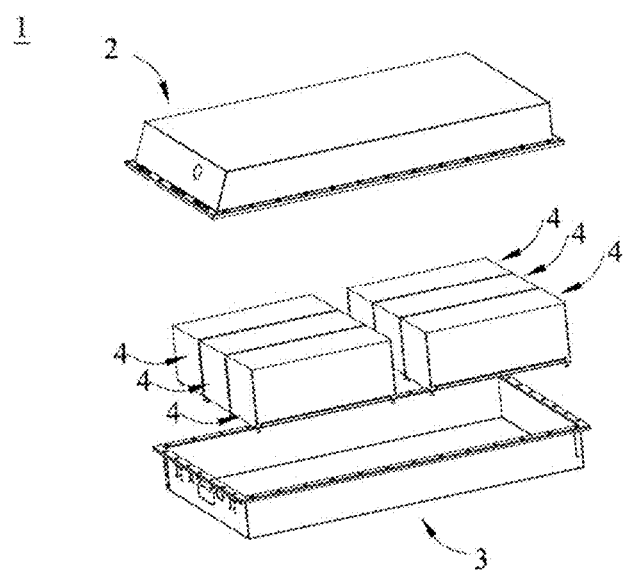
FIG. 8 is an exploded view of the battery pack according to the embodiment of this application in FIG. 7.

FIG. 7 and FIG. 8 show a battery pack 1 as an example. Referring to FIG. 7 and FIG. 8, the battery pack 1 may include a battery box and a plurality of battery modules 4 arranged in the battery box. The battery box includes an upper box body 2 and a lower box body 3. The upper box body 2 can cover the lower box body 3 to form an enclosed space for accommodating the battery module 4. The plurality of battery modules 4 may be arranged in the battery box in any manner.

In addition, this application further provides an electric apparatus. The electric apparatus includes at least one of the secondary battery, the battery module, or the battery pack provided in this application. The secondary battery, the battery module, or the battery pack may be used as a power source for the electric apparatus, or an energy storage unit of the electric apparatus. The electric apparatus may include a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite system, an energy storage system, and the like, but is not limited thereto.

The secondary battery, the battery module, or the battery pack may be selected for the electric apparatus based on requirements for using the electric apparatus.

Figure 9:
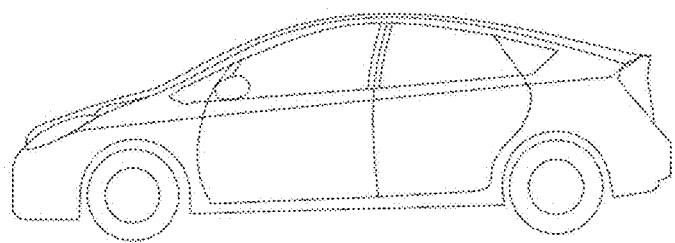
FIG. 9 is a schematic diagram of an electric apparatus using a secondary battery in an embodiment of this application as a power source.

FIG. 9 shows an electric apparatus as an example. The electric apparatus is a battery electric vehicle, a hybrid electric vehicle, a plug-in hybrid electric vehicle, or the like. To satisfy a requirement of the electric apparatus for high power and high energy density of the secondary battery, a battery pack or a battery module may be used.

In another example, the apparatus may be a mobile phone, a tablet computer, a notebook computer, or the like. Such apparatus is generally required to be light and thin and may use a secondary battery as its power source.

EXAMPLE

The following describes examples in this application. The examples described below are exemplary and only used to explain this application, but cannot be understood as a limitation of this application. Examples whose technical solutions or conditions are not specified are made based on technical solutions or conditions described in documents in the art, or made based on the product specification. The reagents or instruments used are all conventional products that can be purchased on the market if no manufacturer is indicated.

Example 1-1

Preparation of Copper Plating Solution

1. Deionized water was added into a container with an added amount equal to ⅔ of a volume of deionized water required;

2. 98% concentrated sulfuric acid was added in proportion and mixed, with a liquid temperature below 50° C. in the mixing process; and the liquid was left standing for 1 h till the liquid temperature drops to below 30° C.;

3. Copper sulfate was added in proportion, and the liquid was mixed till the copper sulfate fully dissolved;

4. Hydrochloric acid, bis-(sodium sulfopropyl)-disulfide as a brightener, a compound represented by formula I as a leveling agent, and polyethylene glycol (a number-average molecular weight thereof is 10000) as a moistening agent were added and mixed;

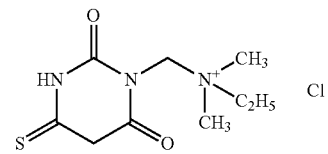

I

5. Remaining ⅓ volume of deionized water was added and mixed uniformly to obtain the copper plating solution. Components of the copper plating solution were 90 g/L of copper sulfate, 95 mL/L of 98% sulfuric acid, 65 ppm of hydrochloric acid measured in chloride ions, 7 mL/L of the brightener, 2.5 mL/L of the leveling agent, 1.3 mL/L of the moistening agent, and deionized water for the rest part; and the copper plating solution had a pH value of 1.

Preparation of Negative Electrode Composite Current Collector

A copper layer was plated on a surface of a polymer matrix by using a physical vapor deposition (PVD) method to obtain a polyimide PVD base matrix; the polyimide PVD base matrix was used as a cathode, and a phosphorous copper was used as an anode, which were placed in an electroplating bath containing the copper plating solution for direct current electroplating.

Electroplating Parameters are as Follows:

Electroplating temperature: 25° C.;

Cathode current density: 2 A/dm²;

Anode current density: 0.5 A/dm²;

Electroplating time: 2 min.

Example 1-2

Preparation of copper plating solution and negative electrode composite current collector basically followed that in Example 1-1 except that the leveling agent was replaced with a compound represented by formula II.

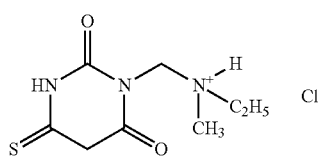

II

Example 1-3

Preparation of copper plating solution and negative electrode composite current collector basically followed that in Example 1-1 except that the leveling agent was replaced with a compound represented by formula III.

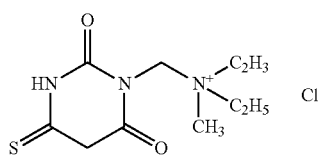

III

Example 1-4

Preparation of copper plating solution and negative electrode composite current collector basically followed that in Example 1-1 except that the leveling agent was replaced with a compound represented by formula IV.

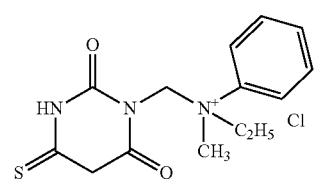

IV

Example 1-5

Preparation of copper plating solution and negative electrode composite current collector basically followed that in Example 1-1 except that the leveling agent was replaced with a compound represented by formula V.

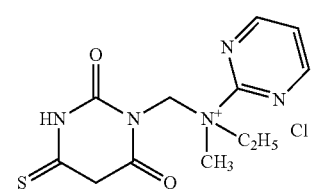

V

Comparative Example 1-1

Preparation of copper plating solution and negative electrode composite current collector basically followed that in Example 1-1 except that the leveling agent was replaced with a compound represented by formula VI.

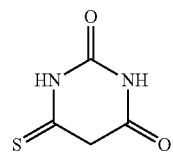

VI

Comparative Example 1-2

Preparation of copper plating solution and negative electrode composite current collector basically followed that in Example 1-1 except that the leveling agent was replaced with a compound represented by formula VII.

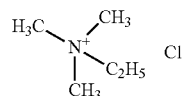

VII

Comparative Example 1-3

Preparation of copper plating solution and negative electrode composite current collector basically followed that in Example 1-1 except that no leveling agent was added.

Example 2-1

Preparation of copper plating solution and negative electrode composite current collector basically followed that in Example 1-1 except that a concentration of the leveling agent in the copper plating solution was 1 mL/L.

Example 2-2

Preparation of copper plating solution and negative electrode composite current collector basically followed that in Example 1-1 except that a concentration of the leveling agent in the copper plating solution was 4 mL/L.

Example 2-3

Preparation of copper plating solution and negative electrode composite current collector basically followed that in Example 1-1 except that a concentration of the leveling agent in the copper plating solution was 0.5 mL/L.

Example 2-4

Preparation of copper plating solution and negative electrode composite current collector basically followed that in Example 1-1 except that a concentration of the leveling agent in the copper plating solution was 6 mL/L.

Example 2-5

Preparation of copper plating solution and negative electrode composite current collector basically followed that in Example 1-1 except that the brightener was replaced with sodium 3-mercaptopropanesulphonate.

Example 2-6

Preparation of copper plating solution and negative electrode composite current collector basically followed that in Example 1-1 except that the moistening agent was replaced with polypropylene glycol having a number-average molecular weight of 10000.

Example 3-1

Preparation of copper plating solution and negative electrode composite current collector basically followed that in Example 1-1 except that acetaldehyde and ethylene diamine tetraacetic acid were further added at a volume ratio of 2:1 as grain refiners, and a concentration of the grain refiners in the copper plating solution was 0.08 mL/L.

Example 3-2

Preparation of copper plating solution and negative electrode composite current collector basically followed that in Example 1-1 except that acetaldehyde and ethylene diamine tetraacetic acid were further added at a volume ratio of 2:1 as grain refiners, and a concentration of the grain refiners in the copper plating solution was 0.01 mL/L.

Example 3-3

Preparation of copper plating solution and negative electrode composite current collector basically followed that in Example 1-1 except that acetaldehyde and ethylene diamine tetraacetic acid were further added at a volume ratio of 2:1 as grain refiners, and a concentration of the grain refiners in the copper plating solution was 0.1 mL/L.

Example 3-4

Preparation of copper plating solution and negative electrode composite current collector basically followed that in Example 1-1 except that acetaldehyde was further added as a grain refiner, and a concentration of the acetaldehyde in the copper plating solution was 0.01 mL/L.

Example 3-5

Preparation of copper plating solution and negative electrode composite current collector basically followed that in Example 1-1 except that acetaldehyde was further added as a grain refiner, and a concentration of the acetaldehyde in the copper plating solution was 0.03 mL/L.

Example 3-6

Preparation of copper plating solution and negative electrode composite current collector basically followed that in Example 1-1 except that acetaldehyde was further added as a grain refiner, and a concentration of the acetaldehyde in the copper plating solution was 0.05 mL/L.

Example 3-7

Preparation of copper plating solution and negative electrode composite current collector basically followed that in Example 1-1 except that ethylene diamine tetraacetic acid was further added as a grain refiner, and a concentration of the ethylene diamine tetraacetic acid in the copper plating solution was 0.05 mL/L.

Example 3-8

Preparation of copper plating solution and negative electrode composite current collector basically followed that in Example 1-1 except that ethylene diamine tetraacetic acid was further added as a grain refiner, and a concentration of the ethylene diamine tetraacetic acid in the copper plating solution was 0.12 mL/L.

Performance test of negative electrode composite current collector:

1. Plating Adhesion

Test method for adhesion of metal layer: a double-sided adhesive tape was pasted on a flat and smooth steel plate, and the composite current collector was cut into sections having the same width as the double-sided adhesive tape; the composite current collector was pasted flatly on a surface of the double-sided adhesive tape, and the double-sided adhesive tape on the surface was cut into sections with a same width as the composite current collector, which were attached to the surface of the composite current collector; an A4 paper strip larger than a length of the steel plate was attached at the head of the composite current collector, a 2.5 kg roller was used to roll back and forth on the surface till the adhesive tape was flat, the steel plate was fastened to a tensile machine at one end, and the A4 paper strip together with the adhesive tape on the surface was fastened to the other end of the tensile machine; and the adhesive tape was peeled off at a speed of 500 mm/min to obtain a peeling force curve, and a mean peeling force was calculated.

2. Tensile Strength

A current collector was cut into strips of 15 mm×150 mm with a strip sampler, and strip samples that had been cut were tested using a tensile machine. The tensile machine had an initial spacing of 50 mm and was stretched at a constant rate of 50 mm/min till the sample was broken. A tensile strength was read directly from the tensile machine.

3. Elongation

A current collector was cut into strips of 15 mm×150 mm with a strip sampler, and strip samples that had been cut were tested using a tensile machine. The tensile machine had an initial spacing of 50 mm and was stretched at a constant rate of 50 mm/min till the sample was broken. A tensile strength was read directly from the tensile machine. An elongation at break=stretching distance/initial spacing ×100%, in other words, an elongation rate.

Performance Test of Secondary Battery

The negative electrode composite current collectors obtained in the foregoing examples and comparative examples were separately prepared into secondary batteries as shown below for performance testing.

1. Preparation of Secondary Battery

Using a common battery manufacturing process, a positive electrode plate (compaction density: 3.4 g/cm$^3$), a PP/PE/PP separator, and a negative electrode plate (compaction density: 1.6 g/cm$^3$) were wound together to form a bare battery cell, then the bare battery cell was placed into a battery housing, an electrolyte (an EC:EMC volume ratio was 3:7, and LiPF$_6$ was 1 mol/L) was injected, and then sealing, formation, and other processes were performed to finally obtain a lithium-ion battery.

2. Cycling Performance Test of Secondary Battery

The lithium-ion batteries were subjected to cycle life test and a specific test method was as follows:

The lithium-ion batteries were charged and discharged at 25° C., to be specific, first charged to 4.2 V at a current of 1 C, and then discharged to 2.8 V at a current of 1 C, and discharge capacities in the first cycle were recorded. The batteries were charged and discharged for 1000 cycles at 1 C/1 C, and discharge capacities in the $1000^{th}$ cycle were recorded. The discharge capacities in the $1000^{th}$ cycle were divided by the discharge capacities in the first cycle, respectively, to obtain capacity retention rates in the $1000^{th}$ cycle, and the numbers of battery cycles to 80% state of health were recorded.

TABLE 1

Impact of structure of leveling agent on performance of negative electrode composite current collector and battery

| Example | Structural formula of leveling agent | Concentration of leveling agent (mL/L) | Plating adhesion (N) | Tensile strength (MPa) | Elongation (%) | Battery cycles to 80% state of health | Capacity retention rate after 1000 cycles |
|---|---|---|---|---|---|---|---|
| Example 1-1 | I | 2.5 | 2.4 | 192 | 4.6 | 2292 | 91.0% |
| Example 1-2 | II | 2.5 | 2.4 | 186 | 4.6 | 2267 | 90.5% |
| Example 1-3 | III | 2.5 | 2.3 | 189 | 4.5 | 2255 | 90.4% |
| Example 1-4 | IV | 2.5 | 2.3 | 188 | 4.4 | 2221 | 90.3% |
| Example 1-5 | V | 2.5 | 2.3 | 190 | 4.6 | 2259 | 90.6% |
| Comparative Example 1-1 | VI | 2.5 | 1.3 | 168 | 1.5 | 1565 | 85.4% |
| Comparative Example 1-2 | VII | 2.5 | 1.1 | 166 | 1.4 | 1403 | 84.0% |
| Comparative Example 1-3 | / | / | 0.8 | 145 | 2.1 | 1325 | 82.2% |

TABLE 2

Impact of type and concentration of additive on performance of negative electrode composite current collector and battery

| Example | Brightener Type | Brightener Concentration (mL/L) | Moistening agent Type | Moistening agent Concentration (mL/L) | Leveling agent Type | Leveling agent Concentration (mL/L) | Plating adhesion (N) | Tensile strength (MPa) | Elongation (%) | Battery cycles to 80% state of health | Capacity retention rate after 1000 cycles |
|---|---|---|---|---|---|---|---|---|---|---|---|
| Example 1-1 | Bis-(sodium sulfopropyl)-disulfide | 7 | Polyethylene glycol | 1.3 | I | 2.5 | 2.4 | 192 | 4.6 | 2292 | 91.0% |
| Example 2-1 | Bis-(sodium sulfopropyl)-disulfide | 7 | Polyethylene glycol | 1.3 | I | 1 | 2.5 | 188 | 4.4 | 2262 | 90.6% |
| Example 2-2 | Bis-(sodium sulfopropyl)-disulfide | 7 | Polyethylene glycol | 1.3 | I | 4 | 2.4 | 186 | 4.5 | 2185 | 90.1% |
| Example 2-3 | Bis-(sodium sulfopropyl)-disulfide | 7 | Polyethylene glycol | 1.3 | I | 0.5 | 1.9 | 175 | 3.1 | 1978 | 88.6% |
| Example 2-4 | Bis-(sodium sulfopropyl)-disulfide | 7 | Polyethylene glycol | 1.3 | I | 6 | 2.0 | 170 | 3.3 | 1935 | 87.7% |
| Example 2-5 | 3-mercaptopropane-sulphonate | 7 | Polyethylene glycol | 1.3 | I | 1 | 2.5 | 190 | 4.4 | 2258 | 90.5% |
| Example 2-6 | Bis-(sodium sulfopropyl)-disulfide | 7 | Polypropylene glycol | 1.3 | I | 1 | 2.5 | 2.3 | 185 | 4.5 | 2232 | 90.3% |

TABLE 3

Impact of structure of grain refiner on performance of negative electrode composite current collector and battery

| | Leveling agent | | Grain refiner | | Performance of negative electrode composite current collector | | | Battery performance | |
|---|---|---|---|---|---|---|---|---|---|
| | | | | | Plating | Tensile | | Battery | Capacity |
| | | | | | adhesion | strength | Elongation | cycles to | retention |
| Example | Type | Concentration (mL/L) | Type | Concentration (mL/L) | (N) | (MPa) | (%) | 80% state of health | rate after 1000 cycles |
| Example 1-1 | I | 2.5 | / | / | 2.4 | 192 | 4.6 | 2292 | 91.0% |
| Example 3-1 | I | 2.5 | Acetaldehyde + ethylene diamine tetraacetic acid | 0.08 | 3.0 | 207 | 5.5 | 2318 | 91.9% |
| Example 3-2 | I | 2.5 | Acetaldehyde + ethylene diamine tetraacetic acid | 0.01 | 2.7 | 198 | 5.0 | 2304 | 91.5% |
| Example 3-3 | I | 2.5 | Acetaldehyde + ethylene diamine tetraacetic acid | 0.1 | 2.9 | 201 | 5.3 | 2313 | 91.8% |
| Example 3-4 | I | 2.5 | Acetaldehyde | 0.01 | 2.5 | 194 | 4.7 | 2296 | 91.2% |
| Example 3-5 | I | 2.5 | Acetaldehyde | 0.03 | 2.6 | 197 | 4.9 | 2301 | 91.4% |
| Example 3-6 | I | 2.5 | Acetaldehyde | 0.05 | 2.6 | 195 | 4.8 | 2299 | 91.3% |
| Example 3-7 | I | 2.5 | Ethylene diamine tetraacetic acid | 0.05 | 2.5 | 196 | 4.8 | 2298 | 91.3% |
| Example 3-8 | I | 2.5 | Ethylene diamine tetraacetic acid | 0.12 | 2.7 | 197 | 4.9 | 2302 | 91.4% |

Figure 2:
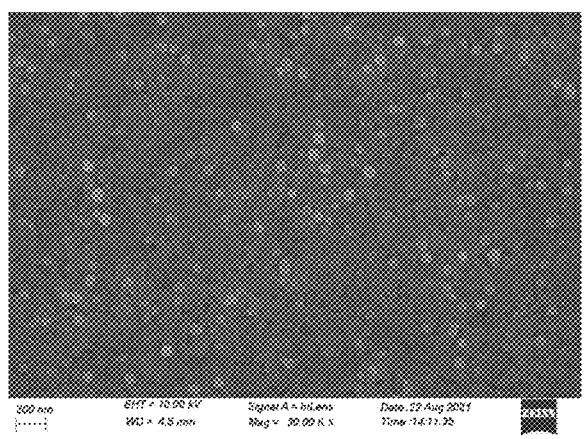
FIG. 2 is an SEM image of a copper layer prepared according to Example 1-1 of this application.

It can be seen from Table 1 to Table 3 that, plating adhesion, tensile strength, and elongation of negative electrode composite current collectors in all the foregoing examples are significantly higher than that in the comparative examples. Accordingly, cycling performance of lithium-ion batteries corresponding to all the examples are also better than that in the comparative examples. In addition, comparing FIG. 1 and FIG. 2, it can be seen that uniformity of copper layers obtained using copper plating solutions containing leveling agents having structures according to this application is significantly better than that of copper layers obtained using conventional PCB plating solutions.

Comprehensively comparing Example 1-1 to Example 1-5, when copper plating solutions contain the leveling agents having the structures, negative electrode composite current collectors prepared using the copper plating solutions have plating adhesion of greater than 2.3N, tensile strength of greater than 186 MPa, and elongation of greater than 4.4%. In addition, the numbers of battery cycles of lithium-ion batteries containing negative electrode composite current collectors with 80% state of charge are greater than 2221, and capacity retention rates of the lithium-ion batteries after 1000 cycles are higher than 90.3%.

Comprehensively comparing Example 1-1 with Example 2-1 to Example 2-6, when leveling agents contained in copper plating solutions are 1-4 mL/L, plating adhesion, tensile strength, and elongation of negative electrode composite current collectors prepared using the copper plating solutions are further improved.

Figure 3:
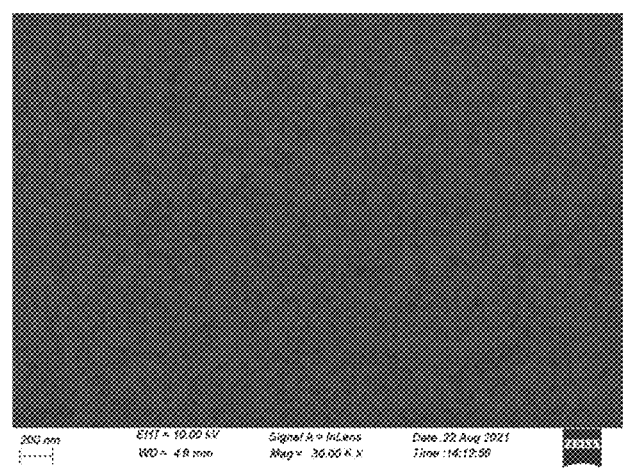
FIG. 3 is an SEM image of a copper layer prepared according to Example 3-1 of this application.

Comprehensively comparing Example 1-1 with Example 3-1 to Example 3-8, when copper plating solutions further contain grain refiners, plating adhesion, tensile strength, and elongation of negative electrode composite current collectors prepared using the copper plating solutions are further improved, thereby further improving cycling performance of lithium-ion batteries. In addition, it can be seen from FIG. 2 and FIG. 3 that grain refiners can further improve uniformity of copper layers obtained.

It should be noted that this application is not limited to the foregoing Examples. The foregoing embodiments are merely examples, and embodiments having constructions substantially the same as those of the technical idea and having the same effects as the technical idea within the scope of the technical solutions of this application are all included in the technical scope of this application. In addition, within the scope without departing from the essence of this application, various modifications that can be conceived by persons skilled in the art are applied to the embodiments, and other modes constructed by combining some of the constituent elements in the embodiments are also included in the scope of this application.

The invention claimed is:

1. A copper plating solution for a composite current collector, comprising a leveling agent represented by a general formula (

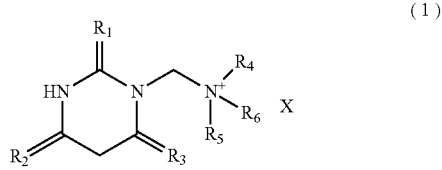

(1)

wherein an anion X is F, Cl, or Br,
$R_1$, $R_2$, and $R_3$ are each independently selected from O or S; and
$R_4$, $R_5$, and $R_6$ are each independently selected from hydrogen, a substituted or unsubstituted alkyl, a substituted or unsubstituted vinyl, a substituted, or unsubstituted aqi, and a substituted or unsubstituted heteroaryl.

2. The copper plating solution according to claim 1, wherein $R_4$, $R_5$, and $R_6$ are each independently selected from hydrogen, a substituted or unsubstituted alkyl having carbon atoms, a substituted or unsubstituted vinyl having 2-6 carbon atoms, and a substituted or unsubstituted pyrimidyl.

3. The copper plating solution according to claim 1, further comprising copper sulfate, sulfuric acid, hydrochloric acid, a brightener, a moistening agent, and deionized water.

4. The copper plating solution according to claim 3, characterized in that
the brightener is a compound containing a disulfide bond, a sulfonic acid group, or a sulfhydryl group.

5. The copper plating solution according to claim 4, wherein the brightener is one or two of bis-(sodium sulfopropyl)-disulfide and sodium 3-mercaptopropanesulphonate.

6. The copper plating solution according to claim 3, wherein the moistening agent is at least one of polyethylene glycol and polypropylene glycol.

7. The copper plating solution according to claim 6, wherein the polyethylene glycol has a number-average molecular weight of 4000-15000, and the polypropylene glycol has a number-average molecular weight of 5000-20000.

8. The copper plating solution according to claim 1, further comprising a grain refiner.

9. The copper plating solution according to claim 8, wherein the grain refiner is at least one of acetaldehyde and ethylene diamine tetraacetic acid.

10. The copper plating solution according to claim 1, wherein each liter of copper plating solution contains 60-120 g/L of copper sulfate, 80-110 mL/L of 98% sulfuric acid, 40-90 ppm of hydrochloric acid measured in chloride ions, 2-12 mL/L of the brightener, 1-4 mL/L of the leveling agent, 0.5-2 mL/L of the moistening agent, 0.01-0.2 mL/L of the grain refiner, and deionized water for the rest part.

11. The copper plating solution according to claim 1, wherein an applicable temperature range of the copper plating solution is 20-50° C., optionally 20-45° C., and further optionally 20-35° C.

12. The copper plating solution according to claim 1, wherein an applicable cathode current density of the copper plating solution is 1-20 A/dm$^2$, optionally 1-15 A/dm$^2$, and further optionally 1-10 A/dm$^2$.

13. The copper plating solution according to claim 1, wherein an applicable anode current density of the copper plating solution is 0.5-3 A/dm$^2$.

14. The copper plating solution according to claim 1, wherein the copper plating solution has a pH value ranging from 0.5 to 4.

15. The copper plating solution according to claim 1, characterized in that the leveling agent is

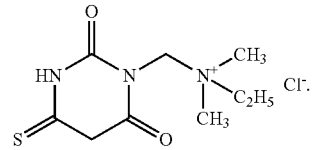

* * * * *